United States Patent
Plato et al.

[11] Patent Number: 6,112,454
[45] Date of Patent: Sep. 5, 2000

[54] INSECT TRAP FOR CAPTURING NUMEROUS SPECIES OF THE COLEOPTERAN ORDER

[75] Inventors: James C. Plato; J. Scott Plato; Stacy E. Plato; Thomas A. Plato, all of Houston, Tex.

[73] Assignee: Plato Industries, Inc., Houston, Tex.

[21] Appl. No.: 09/378,002

[22] Filed: Aug. 19, 1999

[51] Int. Cl.⁷ .............................. A01M 1/10; A01M 1/20
[52] U.S. Cl. ................................................ 43/121; 43/122
[58] Field of Search ............................... 43/107, 121, 122

[56] References Cited

U.S. PATENT DOCUMENTS

| | | |
|---|---|---|
| 161,814 | 4/1875 | Nelson . |
| 249,931 | 11/1881 | Harned . |
| 483,079 | 9/1892 | McAdams . |
| 816,499 | 3/1906 | Pierce . |
| 959,925 | 5/1910 | Evans . |
| 1,059,934 | 4/1913 | Dodard . |
| 1,346,021 | 7/1920 | Harris . |
| 1,626,530 | 4/1927 | Harris . |
| 2,249,601 | 7/1941 | Chapman ................................... 43/121 |
| 2,478,104 | 8/1949 | Johnson ..................................... 43/122 |
| 3,949,515 | 4/1976 | Mitchell et al. .......................... 43/121 |
| 3,987,577 | 10/1976 | Hardee ...................................... 43/121 |
| 4,551,941 | 11/1985 | Schneidmiller ........................... 43/107 |
| 4,611,425 | 9/1986 | Dickerson ................................. 43/121 |
| 5,231,791 | 8/1993 | Falkson ..................................... 43/122 |
| 5,231,792 | 8/1993 | Warner ..................................... 43/122 |
| 5,243,781 | 9/1993 | Carter ....................................... 43/122 |
| 5,339,563 | 8/1994 | Job ............................................ 43/122 |
| 5,392,560 | 2/1995 | Donahue ................................... 43/122 |
| 5,557,880 | 9/1996 | Schneidmiller ........................... 43/122 |

*Primary Examiner*—Kurt Rowan
*Attorney, Agent, or Firm*—Maryam Bani-Jamali Strasburger & Price, L.L.P.

[57] ABSTRACT

The present invention comprises a base member, a guiding member positioned upon and supported by the base member and a capture chamber positioned upon and supported by the guiding member. The base member has a tubular vertical body, an open bottom, a top, a plurality of holes in the vertical body and a number of openings in the top. The guiding member is removably connected to the top of the base member. The guiding member comprises a lower ring, an upper ring with a top surface and an outer vertical surface, plastic member having a lower section that extends between the lower ring and the upper ring and an upper section that extends conically upwards from the upper ring and has an apex with an orifice, connecting means, a number of wings extending from the upper section of the plastic meshes and upon the upper ring and a number of apertures in the top surface of the upper ring. Each connecting means has a hollow upper extension, that is open at its top, and a bottom extension and is used for holding the guiding member in stable position. The capture chamber comprises an open bottom end, a perforated top end, a set of retention blades for holding pheromone dispensers and extending downwards from the perforated top end, a cylindrical upright body, a set of pockets for holding insecticide dispensers, a bottom ring extending outwardly at the open bottom end of and from the cylindrical upright body, locking elements extending downwardly from the bottom ring and a number of perforations in the bottom ring. Optionally, a number of locking pins may be inserted through one corresponding perforation of the bottom ring and then into the corresponding aperture of the upper ring of the guiding member.

21 Claims, 8 Drawing Sheets

INSECT TRAP FOR CAPTURING NUMEROUS SPECIES OF THE COLEOPTERAN ORDER

BACKGROUND OF THE INVENTION

1. Field of the Invention

This invention relates to an insect trap for detecting, capturing, monitoring and controlling populations of numerous injurious species of the Coleopteran order of insects.

2. Description of the Prior Art

Numerous species of the Coleopteran order, particularly the boll weevil, have been the most economically damaging insects in the agriculture of the United States. Hundreds of millions of dollars are lost annually due solely to boll weevils. Use of chemical pesticides for controlling boll weevils is very expensive, adding up to tens of millions of dollars per year for protecting cotton plants that are susceptible to boll weevils. Several traps for capturing boll weevils have been presented in the prior art, particularly in U.S. Pat. Nos. 3,949,515, 3,987,577 and 4,611,425. In general, the traps presented in the patents provide a base member that has a top, an inverted wire mesh funnel that has an orifice and that is connected to the base member to create an annular space between the orifice of the funnel and the top of the base member, and a capture chamber on top of the funnel so that the apex of the funnel substantially extends into the capture chamber. Boll weevils crawl upwardly upon the base member, through the annular space between the funnel and the base member, upwardly along the inside of the funnel, and through an opening at the apex of the funnel, out of the funnel and into the capture chamber. A lure that emits a sex and aggregation pheromone is placed inside the capture chamber to attract the boll weevils to the trap and into the capture chamber. Additionally, insecticides may be placed in the capture chamber to kill the boll weevils. Before the invention of these weevil traps, trapping efforts have not been satisfactory for detecting and monitoring weevil populations (particularly female weevils) during the critical production period of a cotton crop.

SUMMARY OF THE INVENTION

A primary object of the invention is to provide an insect trap for detecting, capturing, monitoring and controlling adult stages of economically damaging insect pest populations, for example cotton boll weevils, sweet potato weevils, pepper weevils, rice water weevils, citrus weevils, pecan weevils and the like.

Another object of the invention is to produce an insect trap that is sufficiently lightweight to be capable of being supported by wooden stakes, broom sticks, bamboo or fiber glass rods.

Yet another object of this invention is to produce an insect trap that is small enough to not interfere with tractors and farm equipment that work around a field.

Still another object of this invention is to provide an insect trap that is more efficient in pheromone liberation, easier to assemble, tamper-proof, easier to mount on stakes and less expensively fabricated than the prior art.

An additional object of this invention is to provide an insect trap that is easy to clean and maintain.

A further object of this invention is to produce an insect trap that may be quickly hand-assembled without using special tools, that has components that when damaged may be readily replaced, that can be readily dissembled and stored and that has parts which may be compactly stored.

Additional objects and advantages of the invention will be set forth in part in a detailed description which follows, and in part will be obvious from the description, or may be learned by practice of the invention.

The present invention is an insect trap that comprises a plastic base member, a plastic guiding member removably connected to and supported by the base member and a capture chamber removably connected to and supported by the guiding member. The base member is injection molded as one piece by using a single mold and comprises a top, an open bottom, a tubular vertical body extending from the top to the open bottom, a number of openings in the top and, optionally, a plurality of holes in the vertical body and a semi-tubular extension extending downwards from the top. The guiding member is injection molded as one piece by using a single mold and is removably connected to the top of the base member. The guiding member comprises a lower ring, an upper ring that is smaller in diameter than the lower ring, plastic meshes and connecting means. The plastic meshes have a lower section, that extends from and connects the lower ring to the upper ring, and an upper section, that extends upwardly from the upper ring as a conical body with an apex having an orifice. The connecting means extend downwardly from and are encircled by the lower section of the plastic meshes and are used for removably connecting the guiding member to the top of the base member. The upper ring is tubular and has an outer vertical surface and a top surface, with a number of apertures in the top surface of the upper ring. A number of wings extend from the conical body of the plastic meshes above and upon the top surface of the upper ring. The capture chamber comprises a cylindrical upright body having an open bottom end and a perforated top end, a bottom ring encircling the bottom end and having a number of perforations, locking elements extending downwardly from the bottom ring, a set of retention blades, extending downwards from the perforated top end, for holding pheromone dispenser and a set of pockets, extending from the cylindrical upright body, for holding the insecticide dispenser. The locking elements of the capture chamber are inserted into corresponding apertures in the upper ring of the guiding member. In addition, a number of locking pins may be each inserted as a security pin via a corresponding boss, that extends upwardly from the bottom ring, and then through the corresponding perforation in the bottom ring of the capture chamber into the corresponding aperture in the upper ring of the guiding member.

It is to be understood that the descriptions of this invention are exemplary and explanatory, but are not restrictive, of the invention. Other objects and advantages of this invention will become apparent from the following specification and from any accompanying charts, examples and drawings.

BRIEF DESCRIPTION OF THE DRAWINGS

The detailed description of the invention is made in reference to the accompanying drawings wherein.

DETAILED DESCRIPTION OF THE PREFERRED EMBODIMENTS

Figure 1:
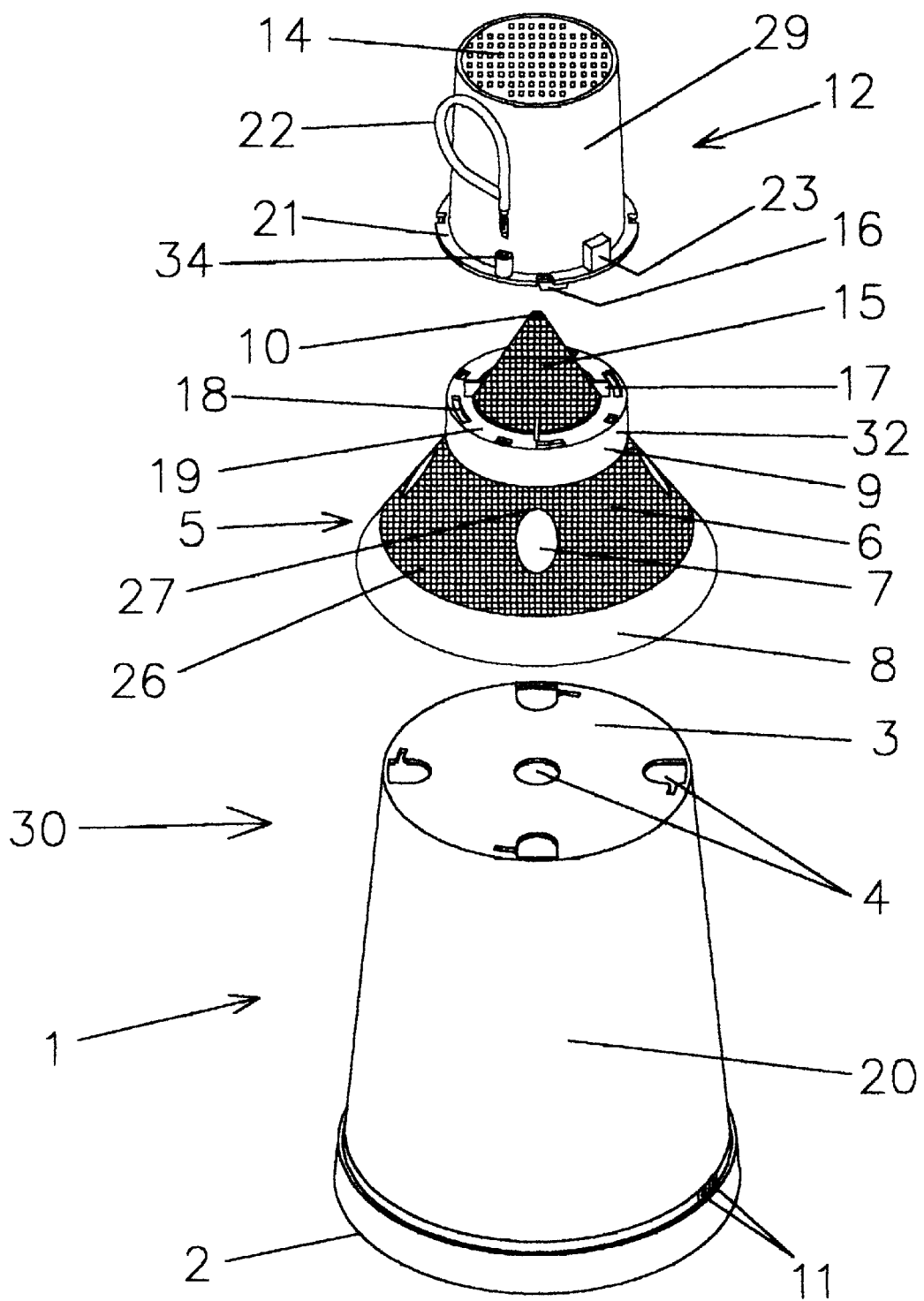
FIG. 1 is an exploded isometric view of an insect trap, comprising a base member, a guiding member and a capture chamber, for capturing numerous species of the Coleopteran order.

Preferred embodiments of the present invention are illustrated in any drawings, charts and examples that are included.

The present invention is an insect trap 30 that comprises a plastic base member 1, a plastic guiding member 5 removably connected to and supported by the base member 1 and a capture chamber 12 removably connected to and supported by the guiding member 5. (Please refer to FIG. 3.) Preferably, the base member 1, the guiding member 5 and the capture chamber 12 are co-axially aligned along their central axis.

The base member 1 is injection molded as one piece by using a single mold and comprises a top 3, an open bottom 2, a tubular vertical body 20 extending from the open bottom 2 to the top 3, a number of openings 4 in the top 3 and, optionally, a plurality of holes 11 in the vertical body 20 and a semi-tubular extension 31 extending downwards from the top 3. (Please refer to FIG. 1, FIG. 2, FIG. 3 and FIG. 7). The plurality of holes 11 are preferably positioned near the open bottom 2 in the vertical body 20 of the base member 1. The vertical body 20 of the base member 1 is preferably cylindrical or tubular in form and has an inner surface and an outer surface. The inner surface and the outer surface may be used for bar coding. The semi-tubular extension 31 is surrounded by the vertical body 20 and is preferably curved.

The number of openings 4 of the top 3 of the base member 1 may serve different purposes. One opening 4, that is central, may serve as an attachment location for a nail or other connecting device on a mounting pole (not shown) which may be used to hold the insect trap 30 in a stable position and to reasonably prevent the displacement of the insect trap 30 due to weather conditions (e.g. wind or rain) or due to other forces (e.g. being hit by an object or a living thing). The insect trap 30 is sufficiently lightweight to be capable of being supported by wooden stakes, broom sticks, bamboo or fiber glass rods. Wooden stakes and broom sticks may be used in the central opening 4 as mounting poles for supporting the insect trap 30. Bamboo and fiber glass rods may also be used as mounting poles to hold the insect trap 30. Bamboo and fiber glass rods are inserted from below into the semi-tubular extension 31. In order to increase the stability of the insect trap 30, a tying means, such as a wire, string or plastic tie, is inserted through the plurality of holes 11 of the tubular vertical body 20 and is used to tie or strap the base member 1 to the bamboo or fiber glass rods. If no mounting pole is used, the open bottom 2 of the base member 1 may be simply affixed to an immobile structure or post.

Some of the number of openings 4 in the top 3 of the base member 1 serve as a passageway, leading from the base member 1 to the guiding member 5, for the insects that crawl upwardly on any mounting pole passing through the base member 1 or upwardly upon the inner surface of the vertical body 20. The open bottom 2 is used for the base member 1 in order to allow the insects to move upwardly on the inner surface of the vertical body 20 of the base member 1. Upon reaching the top 3 of the base member 1, the insects pass through the number of openings 4 of the top 3 of the base member 1 into the guiding member 5. Any insects that move on the outer surface of the vertical body 20, upon reaching the top 3 of the base member 1, move via a gap that exists between the guiding member 5 and the vertical body 20 of the base member 1 into the guiding member 5.

Figure 4A:
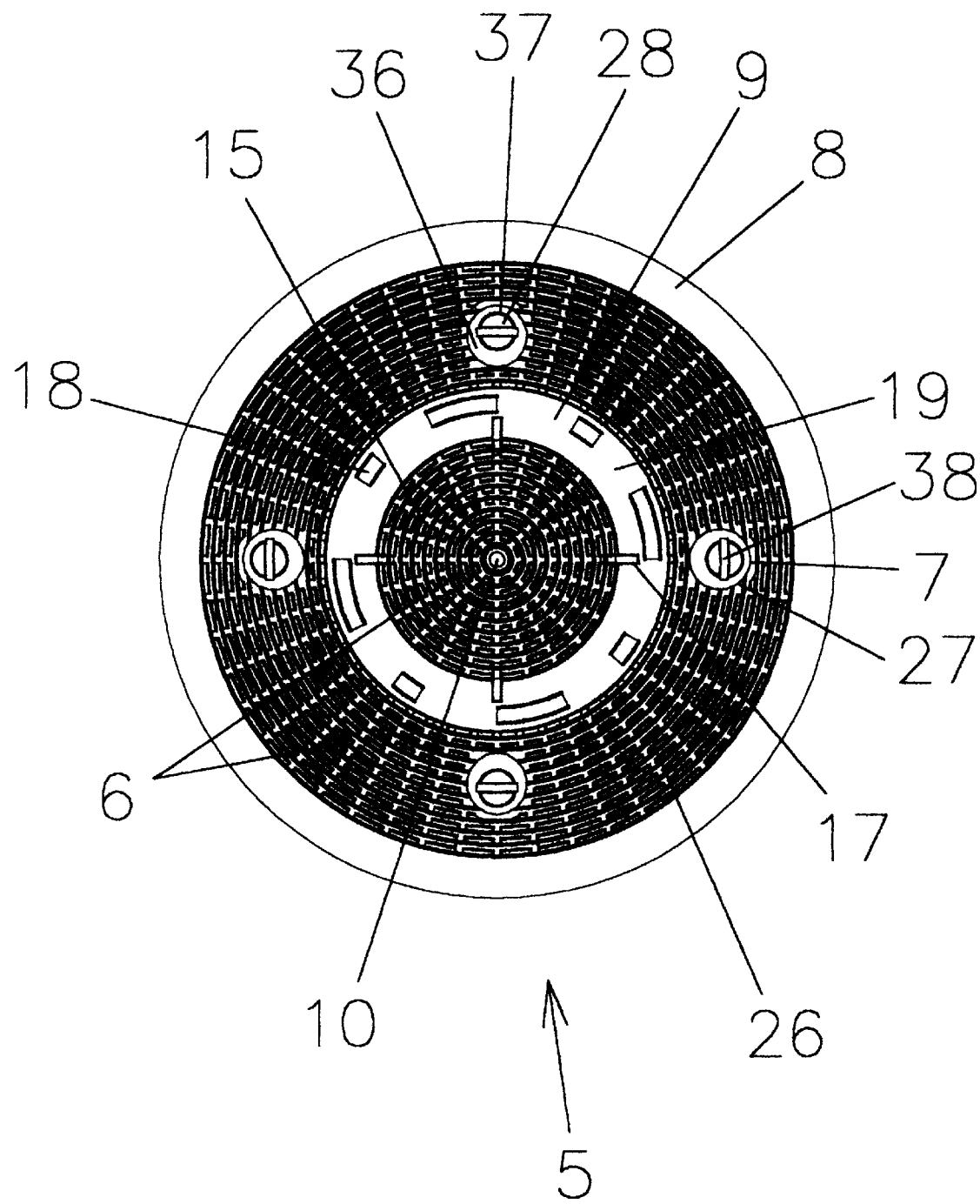
FIG. 4A is a top view of the guiding member of FIG. 1.

The guiding member 5 is injection molded as one piece by using a single mold and is removably connected to the top 3 of the base member 1. As shown in FIG. 1 and FIG. 4A, the guiding member 5 comprises a lower ring 8 that has a larger diameter than the top 3 of the base member 1, an upper ring 9 that has a smaller diameter than the lower ring 8, plastic meshes 6 and connecting means 7. (As defined in The American Heritage Dictionary, Second College Edition, 1985, the term "mesh" refers to "any of the open spaces in a cord, thread or wire network" and the term "meshes" refers to "the cords, threads or wire surrounding these spaces". To avoid any confusion, the term "open spaces" is used herein to refer to the open spaces in the network, while the term "meshes" is used herein to refer to the cords or threads themselves.) Plastic meshes 6, versus a solid or wire funnel, are used since the plastic meshes 6 eliminate heat build-up, as with the solid, and manufacturing problems, as with the wire, while providing for a more efficient pheromone dispersal.

The lower ring 8 has a slanted ringular body that has the same slope as that of the plastic meshes 6. The upper ring 9 has an outer vertical surface 32 that is cylindrical and that extends at a perpendicular angle to horizontal cross-sections of the plastic meshes 6. The upper ring 9 has a top surface 19 that is horizontal and ringular and extends inwardly, towards the central vertical axis of the guiding member 5, from an outer circle (i.e., top of the outer vertical surface 32 of the upper ring 9) to an inner circle. A number of apertures 18 exist in the top surface 19 of the upper ring 9. The upper ring 9 preferably surrounds a hollow space when the insect trap 30 is not assembled. In order to maximize the stability of and minimize movements of the plastic meshes 6 and to hold the plastic meshes 6 in a conical shape, the plastic meshes 6 extend from and connect the lower ring 8 to the upper ring 9 and extend upwardly from and above the upper ring 9. (Please refer to FIG. 2 and FIG. 4A.) The plastic meshes 6 comprise a lower section 26, which includes several discontinuations in the meshes, and an upper section 15 which is conical. The lower section 26 of the plastic meshes 6 extends at a slope from top of the lower ring 8 to bottom of the upper ring 9 of the guiding member 5. The lower section 26 of the plastic meshes 6 ends at bottom of the outer vertical surface 32 of the upper ring 9. Thus, the lower section 26 of the plastic meshes 6 and the ringular body of the lower ring 8 share common surface planes. The upper section 15 of the plastic meshes 6 extends conically upwards from and above the inner circle of the top surface 19 of the upper ring 9 to form a conical body with an apex 10 having an orifice. In a preferred embodiment, the orifice has a diameter of approximately ⅛ inch to ¼ inch. A number of wings 17 extend outwardly from the upper section 15 of the plastic meshes 6 above and upon the top surface 19 of the upper ring 9. The number of wings 17 extend towards the outer vertical surface 32 of the upper ring 9, but do not reach the number of apertures 18 of the top surface 19 of the upper ring 9. (Please refer to FIG. 4A.) The upper section 15 of the plastic meshes 6 is arranged at a position to enable the continuation of the slope of the lower section 26 of the plastic meshes 6, such that the lower section 26, the upper section 15 and the lower ring 8 have the same slope. (Refer to FIG. 1.) Thus, even though the plastic meshes 6 are divided into the lower section 26 and the upper section 15, the plastic meshes 6 are ensemble in a conical shape. The plastic meshes 6 are designed in a conical shape in order to facilitate the movement of the trapped insects into the capture chamber 12, which has a smaller radius than the lower ring 8 of the guiding member 5.

Upon entering the guiding member 5, the insects approach the plastic meshes 6 of the guiding member 5 and crawl upwardly within the guiding member 5 along the plastic meshes 6. Therefore, the open spaces existing among the plastic meshes 6 must be particularly sized to prevent the insects from escaping from the insect trap 30 by exiting via the open spaces of the plastic meshes 6. (The orifice of the apex 10 is not considered as an "open space" existing among the plastic meshes 6. The orifice is a hole at the apex 10 of the plastic meshes 6 and, for the entrapped species, serves as an entrance into the capture chamber 12.) The relatively small orifice of the apex 10 of the plastic meshes 6 has to be at least large enough to allow the exit of the insects from inside the plastic meshes 6 into the capture chamber 12. Meanwhile, the relatively small orifice of the apex 10 has to be small enough to not effect the shape of the plastic meshes 6 and has to be at the very top of the plastic meshes 6 in order to allow the upwardly-crawling insects to move as far into the capture chamber 12 as possible.

Figure 2:
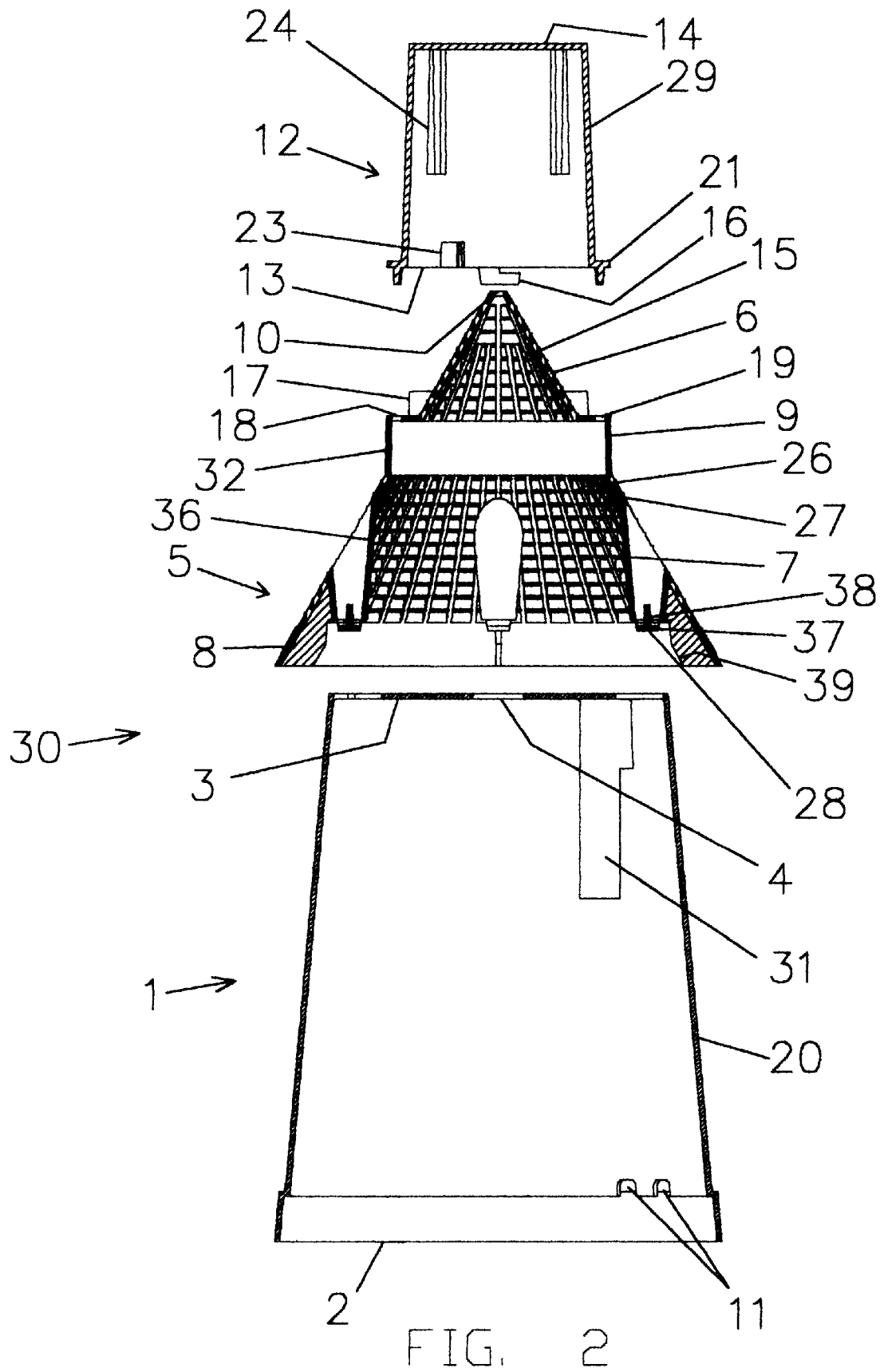
FIG. 2 is a cross-sectional view of the insect trap of FIG. 1.
Figure 4B:
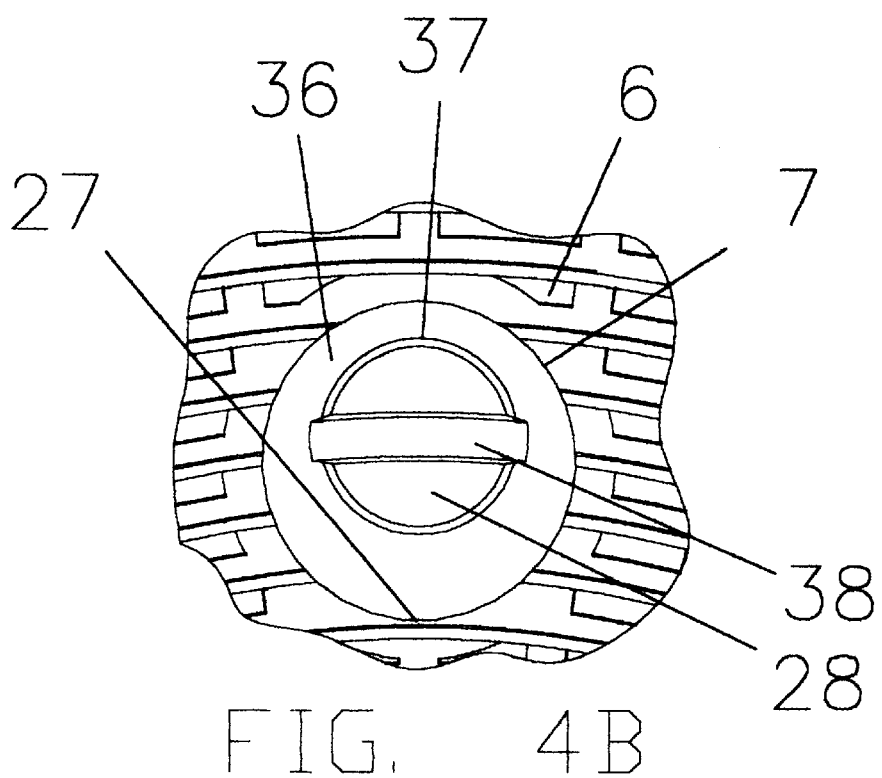
FIG. 4B is an enlarged view of a connecting means used in FIG. 4A.

As shown in FIG. 2, FIG. 4A and FIG. 4B, each connecting means 7 comprises a hollow upper extension 36, a bottom extension 28 and, optionally, a lock foot 39. Each hollow upper extension 36 has an open top 27. All the connecting means 7 extend downwardly from the lower section 26 of the plastic meshes 6, with the open top 27 of each connecting means 7 forming a discontinuation and an empty open area in the plastic meshes 6 of the lower section 26. (Please refer to FIG. 1 and FIG. 2.) The hollow upper extension 36 of the connecting means 7 is designed as a supporting vertical column. The open top 27 of each connecting means 7 is adjusted to conform to the slope of the plastic meshes 6 and to help to maintain the conical shape of and to oppose disfigurement of the plastic meshes 6. In a preferred embodiment, shown in FIG. 2, the open top 27 of the connecting means 7 is considerably wider than the bottom extension 28 of the connecting means 7. However, the insects cannot exit the guiding member 5 via the open top 27 of the connecting means 7 since the hollow upper extension 36 is closed at its bottom. Therefore, the insects that are crawling upwards upon the interior of and along the meshes never enter the hollow upper extension 36 that opens towards outside of the guiding member 5. Also, since the boll weevils only travel upwards, they do not move downwards along outer surface of the hollow upper extension 36. Thus, the connecting means 7 serve as supports for the guiding member 5, without allowing escape of the insects from the insect trap 30.

The bottom extension 28 of the connecting means 7 comprises a round bottom portion 37 and a cross-sectional, upwardly-extending blade 38 (as shown in FIG. 2 and FIG. 4A). The round bottom portion 37 has a top surface that is basically perpendicular to the cross-sectional, upwardly-extending blade 38, which extends upwardly from the round bottom portion 37 to and above the bottom of the hollow upper extension 36. The round bottom portion 37 preferably has a larger horizontal surface area than the cross-sectional, upwardly-extending blade 38 has. Thus, a gap exists between the round bottom portion 37 and the bottom of the hollow upper extension 36.

In a preferred embodiment, the lock foot 39 is optionally used as a secondary means to secure the guiding member 5 to the base member 1. Each lock foot 39 has an upper portion that, when the round bottom portion 37 is being inserted into the corresponding opening 4 of the top 3 of the based member 1, fits tightly around a corresponding part of the tubular vertical body 20. A lower portion of the lock foot 39 preferably extends at an outward angle to the upper portion of the lock foot 39. If desired, the lower portion of the lock foot 39 may be ejectable, such that, when twisting the guiding member 5 around the base member 1, the lower portion of the lock foot 39 straightens and extends along and upon the corresponding portion of the vertical body 20 of the base member 1 if even a minor force is exerted upon the lower portion of the lock foot 39. Thus, the lock foot 39 serves as an additional means to hold the guiding member 5 in place and stable when the guiding member 5 is connected to the base member 1 by the bottom extension 28 of the connecting means 7.

Figure 3:
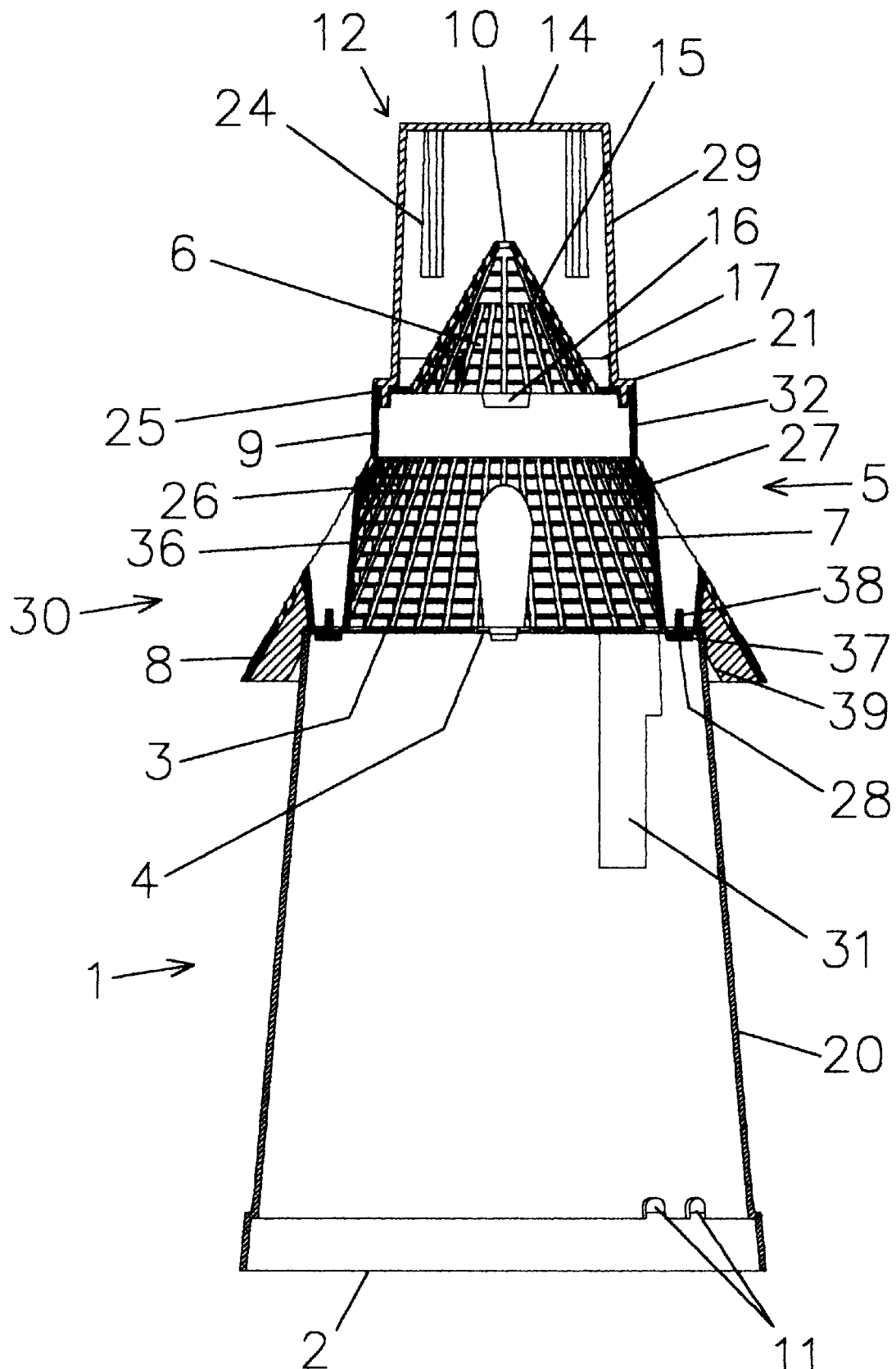
FIG. 3 is an assembled cross-sectional view of FIG. 1.

The bottom extension 28 of the connecting means 7 is an essential component for removably connecting the guiding member 5 to the top 3 of the base member 1. Each bottom extension 28 of the connecting means 7 is removably inserted into the corresponding opening 4 of the top 3 of the base member 1 to interlock the base member 1 and the guiding member 5. The bottom extension 28 is sized to easily fit into the corresponding opening 4 of the top 3 of the base member 1 (as shown in FIG. 3). The number of openings 4 of the top 3 each have a wider section (refer to FIG. 1 and FIG. 7), that is wide enough to allow insertion of only the bottom extension 28 of the connecting means 7, and a narrower section that is wide enough to allow entrance of only the cross-sectional, upwardly extending blade 38 of the bottom extension 28. The guiding member 5 is connected to the base member 1 upon placing the bottom extension 28 of each connecting means 7 into the wider section of the corresponding opening 4 of the base member 1 and then twisting the guiding member 5 in one direction such that the cross-sectional, upwardly extending blade 38 of the bottom extension 28 is moved into and is set in the narrower section of the corresponding opening 4. As long as the cross-sectional, upwardly-extending blade 38 is positioned in the narrower section of the corresponding opening 4, the bottom extension 28 cannot be pulled out of the top 3 since the round bottom portion 37 of the bottom extension 28 has a larger horizontal surface area than the narrower section of the opening 4 does. This serves as an additional locking mechanism that can only be unlocked upon twisting the guiding member 5 in an opposite direction (e.g. clockwise versus counter-clockwise, or vice versa), such that the bottom extension 28 of the connecting means 7 moves into the wider section of the corresponding opening 4 of the top 3 of the base member 1 and can then be pulled out of the top 3. Such a double-locking mechanism has not been used in the prior art and only requires two simple steps: positioning the bottom extension of 28 of the connecting means 7 into the corresponding opening 4 of the top 3 of the base member 1 and slightly twisting the guiding member 5.

In a preferred embodiment, when the insect trap 30 is assembled, the cross-sectional, upwardly-extending blade 38 of each connecting means 7 extends perpendicular to and the round bottom portion 37 extends basically parallel to the top 3 of the base member 1. No matter what type of connecting means 7 is used, when the connecting means 7 are connected to the base member 1, a gap must remain between the tubular vertical body 20 of the base member 1 and the lower ring 8 of the guiding member 5. The gap is required in order to allow the passage of the insects that are crawling on the outside surface of the tubular vertical body 20 of the base member 1 into the guiding member 5. This gap must be large enough to allow the entrance of the insects into the guiding member 5. However, the gap should not be too large to prohibit the insects that are near or on the top 3 of the base member 1 to reach, by crawling, the inner surface of the sloped lower ring 8 and of the lower section 26 of the plastic meshes 6. The dimensional stability of this gap is maintained in the insect trap 30 if the insect trap 30 has been correctly assembled, particularly since separation of the guiding member 5 from the base member 1 is avoided upon application of the connecting means 7. Also, the lower ring 8 and the plastic meshes 6, which are extensions of the lower ring 8, are in a stable position as long as the connecting means 7 are applied.

Figure 6:
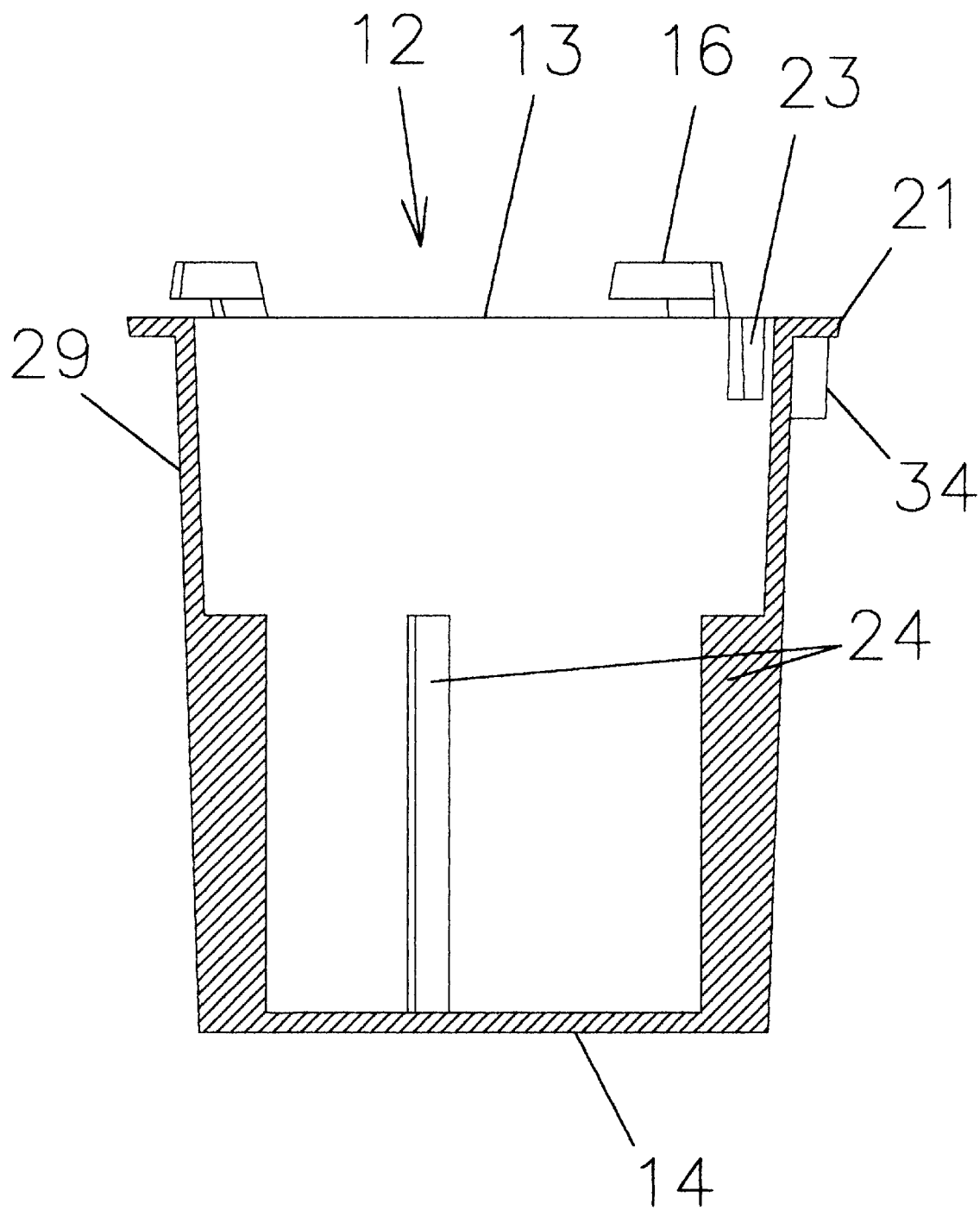
FIG. 6 is an inverted perspective cross-sectional view of the capture chamber of FIG. 1 and is sectioned off the X-axis at an angle of 39°.
Figure 7:
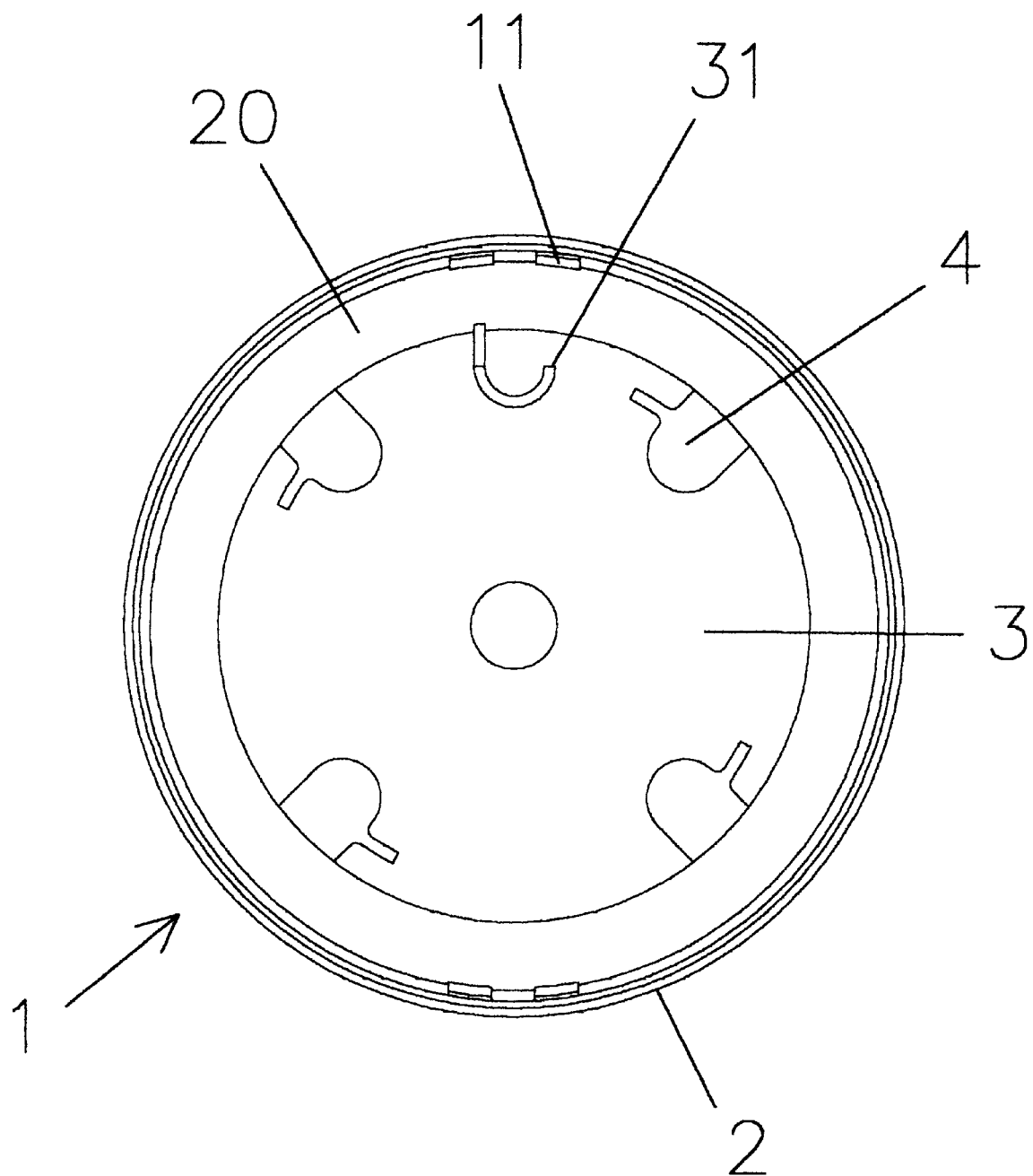
FIG. 7 is a bottom view of the base member of FIG. 1.
Figure 8:
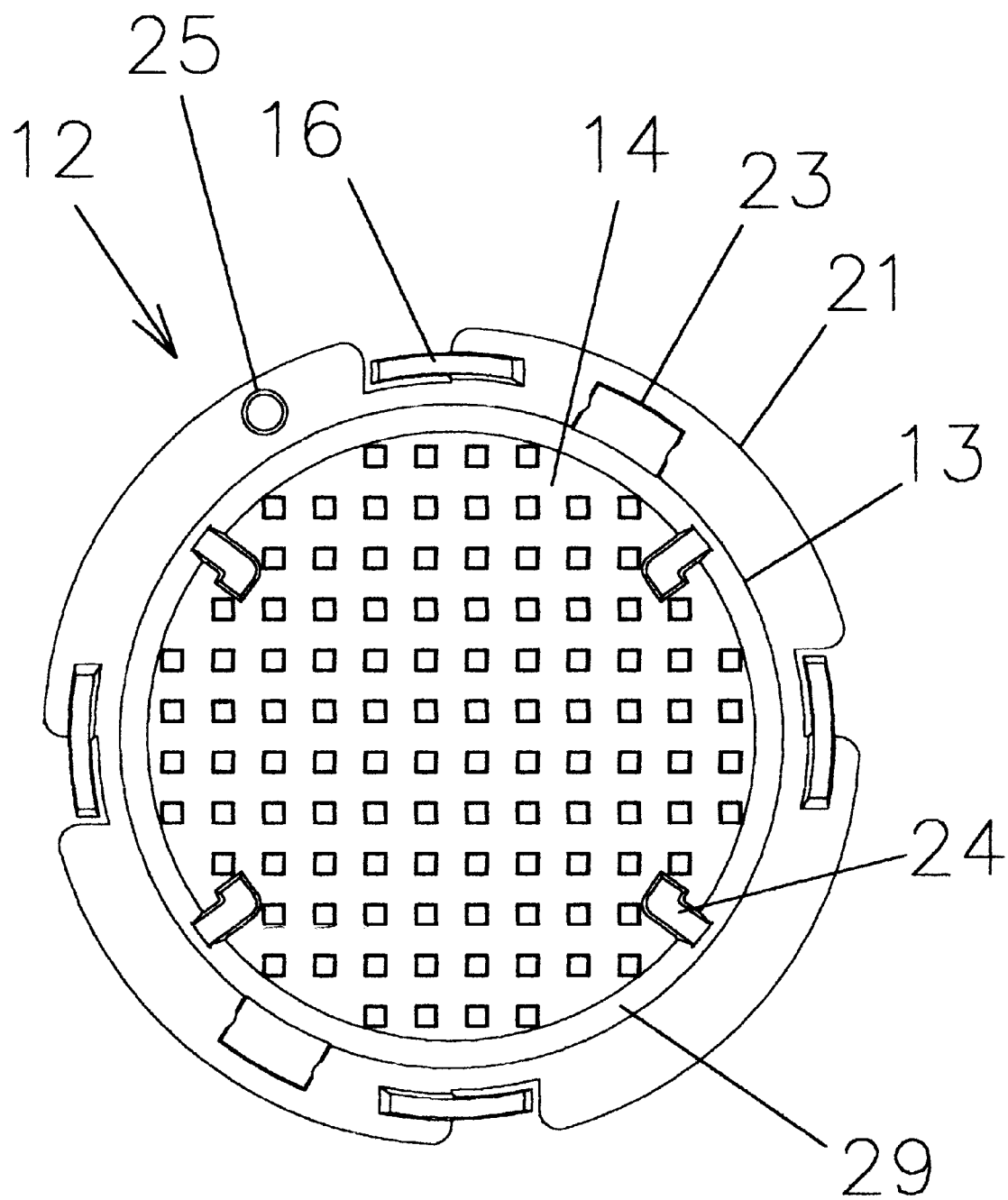
FIG. 8 is a bottom view of the capture chamber of FIG. 1.

The capture chamber 12 comprises a cylindrical upright body 29 having an open bottom end 13 and a perforated top end 14, a bottom ring 21 being an extension of the cylindrical upright body 29 at and encircling the open bottom end 13, locking elements 16 extending downwardly from the bottom ring 21, a number of perforations 25 in the bottom ring 21, a set of retention blades 24 extending downwardly from the perforated top end 14 and a set of pockets 23 extending from the cylindrical upright body 29. (Please refer to FIG. 1, FIG. 6 and FIG. 8.) The set of retention blades 24 is used for holding the pheromone dispenser. With the set of retention blades 24 extending from the perforated top end 14 of the capture chamber 12, the insect trap 30 is more efficient than the prior art in pheromone liberation. The set of pockets 23 serves for holding the insecticide dispenser. The locking elements 16 of the capture chamber 12 are inserted into any corresponding apertures 18 of the upper ring 9 of the guiding member 5. An empty space exists in the upper ring 9 below the top surface 19. Upon twisting the capture chamber 12, after the locking elements 16 of the bottom ring 21 are positioned into the corresponding aperture 18 of the upper ring 9, the locking elements 16 move in the empty space under the top surface 19 of the upper ring 9 and cannot be removed until the capture chamber 12 is twisted back and the locking elements 16 are aligned again with the number of apertures 18.

Figures 5A, 5B:
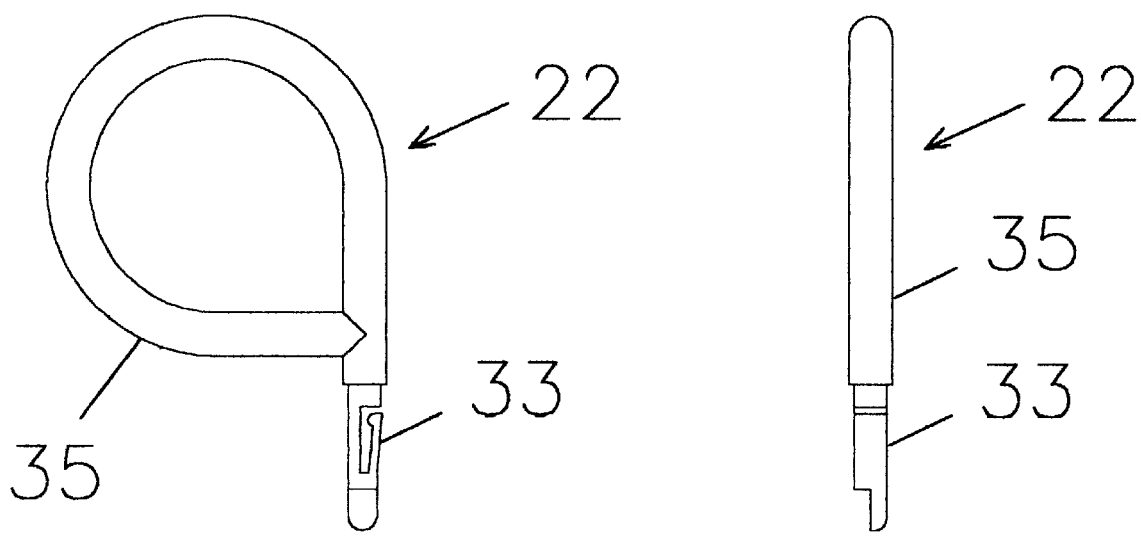
FIG. 5A is a front view of a locking pin used for the capture chamber of FIG. 1.
FIG. 5B is a side view of the locking pin of FIG. 5A.

In addition, a number of locking pins 22 may be each inserted as a security pin via a corresponding boss 34, that extends upwardly from the bottom ring 21, and then via the corresponding perforation 25 under the boss 34 into any corresponding aperture 18 of the upper ring 9 of the guiding member 5. (Please refer to FIG. 1.) Each locking pin 22 comprises an upper body 35, used for handling the locking pin 22, and a thrusting lower body 33. (Please refer to FIG. 5A and FIG. 5B.) When the thrusting lower body 33 connects the capture chamber 12 to the guiding member 5, the upper body 35 is positioned and rests above the boss 34. The thrusting lower body 33 has a thrusting part. The thrusting lower body 33 is sized and shaped such that the thrusting lower body 33 can be easily inserted and can smoothly pass through the boss 34, the corresponding perforation 25 of the bottom ring 21 of the capture chamber 12 and the corresponding aperture 18 of the upper ring 9 of the guiding member 5. Since there is empty space under the top surface 19 of the upper ring 9, as soon as the thrusting lower body 33 is inserted into the corresponding aperture 18 of the upper ring 9 of the guiding member 5, the thrusting part snaps at an angle such that the thrusting part extends in the empty space below the top surface 19 of the upper ring 9. In this manner, the number of locking pins 22 serve as an additional locking mechanism for keeping the capture chamber 12 stably on the guiding member 5. The thrusting part of the thrusting lower body 33 is dimensioned and angled such that, when snapped, the thrusting part gets blocked under the top surface 19 of the upper ring 9. Thus, if the locking pin 22 is to be moved out of the corresponding aperture 18, the thrusting part of the thrusting lower body 33 breaks off and remains under the top surface 19 of the upper ring 9 until removed separately. The number of locking pins 22 serve as optional components of the insect trap 30. However, their use provides several advantages. In addition to increasing the stability of the capture chamber 12 and serving as a second connecting means (as described above), the number of locking pins 22 function as a security or tamper indicator. The break-off feature of the thrusting part of the thrusting lower body 33 provides a proof for tampering of the insect trap 30 and a possibility of incorrect counting of the captured insects.

Also, in order to minimize manufacturing expenses and simplify use of the capture chamber 12, the perforated top end 14 of the capture chamber 12 is preferably irremovable and is an extension of the cylindrical upright body 29 of the capture chamber 12. The perforated top end 14 of the capture chamber 12 may consist of a basically flat surface that is perforated with a number of punctures. Since the pheromone dispenser is preferably positioned in the capture chamber 12, the punctures in the perforated top end 14 of the capture chamber 12 play an essential role in enhancing the pheromone dispersal. In addition, any punctures in the perforated top end 14 of the capture chamber 12 prevent build-up of air pressure in the capture chamber 12 when the insect trap 30 is exposed to sunlight. A suitable carrier of the pheromone is a plastic laminate containing grandlure in an inner layer, said laminate allowing the slow release of grandlure for a relatively long period of time (e.g. two to three weeks). The plastic laminate is placed in the set of retention blades 24 that extend downwards from the perforated top end 14 of the capture chamber 12. An insecticide dispenser is placed in the set of pockets 23 of the capture chamber 12 to kill the insects and to disable the insects from escaping through the orifice of the apex 10 of the guiding member 5.

The bottom ring 21 of the capture chamber 12 preferably fits upon, is removably connected to and is supported by the upper ring 9 of the guiding member 5. Therefore, the bottom ring 21 of the capture chamber 12 preferably has an outer diameter that is equivalent to the outer diameter of the upper ring 9 of the guiding member 5. Meanwhile, the diameter of the cylindrical upright body 29 of the capture chamber 12 is large enough to enable a simple and quick positioning of the open bottom end 13 of the cylindrical upright body 29 around the number of wings 17 extending from the upper section 15 of the plastic meshes 6 of the guiding member 5. In addition, the capture chamber 12 is placed upon the upper ring 9 of the guiding member 5 in such a position to align the locking elements 16 of the capture chamber 12 with their corresponding apertures 18 of the upper ring 9 of the guiding member 5 and to align the number of perforations 25 of the bottom ring 21 of the capture chamber 12 with their corresponding apertures 18 of the upper ring 9 of the guiding member 5. Thus, when the capture chamber 12 is correctly positioned upon the upper ring 9 of the guiding member 5, the locking elements 16 of the capture chamber 12 easily and quickly fit into the corresponding apertures 18 of the upper ring 9. Meanwhile, each locking pin 22 can be easily inserted through the corresponding perforation 25 of the bottom ring 21 and, then, into the corresponding aperture 18 of the upper ring 9. As a result, escape of any species out of the capture chamber 12 is prevented, with no gap existing between the bottom ring 21 of the capture chamber 12 and the upper ring 9 of the guiding member 5 when the capture chamber 12 is correctly positioned upon the upper ring 9. The capture chamber 12 is preferably designed such that upon twisting the capture chamber 12 after the locking elements 16 are placed in the corresponding apertures 18 of the upper ring 9, the number of apertures 18 into which the number of locking pins 22 are to be inserted are aligned with the corresponding perforations 25 of the bottom ring 21 of the capture chamber 12.

In addition, the capture chamber 12 must be long enough to ensure that, not only does the apex 10 of the plastic meshes 6 of the guiding member 5 rest in the capture chamber 12 but also, some free space remains between the apex 10 of the upper section 15 of the plastic meshes 6 and the perforated top end 14 of the capture chamber 12. When the insect trap 30 is assembled, some free space is needed between the upper section 15 of the plastic meshes 6 and the capture chamber 12 for collection of any insects that exit the plastic meshes 6 via the orifice at the apex 10. Meanwhile, the insect trap 30 is small enough to not interfere with tractors and farm equipment that work around a field.

With the base member 1, the guiding member 5 and the capture chamber 12 being readily removable, they may be easily cleaned, maintained and replaced, making the insect trap 30 very economical and long-lasting. In addition, due to their removability, the insect trap 30 may be readily assembled, dissembled, loaded, stacked and compactly stored. The insect trap 30 may be quickly hand assembled without special tools. As a result, the insect trap 30 provides substantial savings in labor and storage requirements.

The insect trap 30 preferably includes polypropylene, making the insect trap 30 flexible and recyclable. Ultraviolet-resistant components may be used in the insect trap 30. Thus, any physical degradation of the insect trap 30 is minimized.

The base member 1 of the insect trap 30 is preferably fluorescent yellow-green in color. Such color has been proven, through years of careful research, to be attractive to various Coleopteran species. Of course, although it is optional, it is not necessary to make every component of the insect trap 30 fluorescent yellow-green. The capture chamber 12 is made of clear plastic to allow the user to determine, without having to remove the capture chamber 12, the effectiveness of the insect trap 30 by periodically visually inspecting the contents inside the capture chamber 12.

Certain objects are set forth above and made apparent from the foregoing description and examples, as well as drawings. However, since certain changes may be made in the drawings, description and examples without departing from the scope of the invention, it is intended that all matters contained in the drawings, description and examples shall be interpreted as illustrative only of the principles of the invention and not in a limiting sense. With respect to the drawings, description and examples, it is to be realized that any descriptions, drawings and examples deemed readily apparent and obvious to one skilled in the art and all equivalent relationships to those stated in the examples, described in the specification and shown in the drawings are intended to be encompassed by the present invention.

Further, since numerous modifications and changes will readily occur to those skilled in the art, it is not desired to limit the invention to the exact construction and operation shown and described and, accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

Insect trap 30
  Base member 1
    semi-tubular extension 31
    top 3
      number of openings 4
    open bottom 2
    tubular vertical body 20
      plurality of holes 11
  Guiding member 5
    plastic meshes 6
      upper section 15
      lower section 26
      apex 10
    lower ring 8
    upper ring 9
      outer vertical surface 32
      number of wings 17
      number of apertures 18
      top surface 19
    connecting means 7
      lock foot 39
      hollow upper extension 36
      open top 27
    bottom extension 28
      round bottom portion 37
      cross-sectional, upwardly-extending blade 38
  Capture chamber 12
    open bottom end 13
    perforated top end 14
      set of retention blades 24(pheromone)
    bottom ring 21
    locking elements 16
    number of perforations 25
  number of locking pins 22
    upper body 35
    thrusting lower body 33
    boss 34
  cylindrical upright body 29
    set of pockets 23 (insecticide)

What is claimed is:

1. An insect trap for capturing numerous species of the Coleopteran order, said insect trap comprising:

(a) a plastic base member that is injection molded as one piece by using a single mold and that comprises:
  (i) a top,
  (ii) an open bottom,
  (iii) a tubular vertical body extending from the open bottom to the top, and
  (iv) a number of openings in the top;

(b) a plastic guiding member that is removably connected to the top of and supported by the base member, that is injection molded as one piece by using a single mold and that comprises:
  (i) a lower ring that has a sloped ringular body and that is larger in diameter than the top of the base member,
  (ii) an upper ring that is smaller in diameter than the lower ring and that comprises a cylindrical outer vertical surface, a horizontal, ringular top surface extending inwards from top of the outer vertical surface towards central vertical axis of the guiding member and a number of apertures in the top surface, (iii) plastic meshes that comprise a lower section, extending from and connecting the lower ring to the upper ring and having the same slope as the lower ring, and an upper section, extending upwardly from and above the upper ring as a conical body that has an apex and an orifice at the apex, (iv) connecting means that extend downwardly from the lower section of the plastic meshes and that each comprises a hollow upper extension, having an open top that forms a discontinuation in the plastic meshes of the lower section and serving as a supporting vertical column, and a bottom extension, comprising a round bottom portion and a cross-sectional, upwardly-extending blade that has a smaller horizontal surface area than the round bottom portion has and that extends upwardly from the round bottom portion to and above the bottom of the hollow upper extension, such that a space exists between the round bottom portion and bottom of the hollow upper extension and such that a gap forms between the lower ring of the guiding member and the tubular vertical body of the base member when the bottom extension is removably inserted into the corresponding opening of the top of the base member, and (v) a number of wings that extend from the upper section of the plastic meshes above and upon the top surface of the upper ring, but that do not reach the number of apertures of the top surface of the upper ring; and (c) a capture chamber that is removably connected to the upper ring of and supported by the guiding member and that comprises:

(i) a cylindrical upright body that has an open bottom end, that is sufficiently large to enable a simple, quick positioning of the open bottom end of the cylindrical, upright body around the number of wings of the guiding member, and that is sufficiently long to ensure that the upper section of the plastic meshes rests in the capture chamber and that some free space remains between the upper section of the plastic meshes and the capture chamber, (ii) a perforated top end that is an extension of the cylindrical upright body, (iii) a bottom ring that is an extension of the cylindrical upright body at the open bottom end, that encircles the open bottom end of the cylindrical upright body and that is positioned upon the upper ring of the guiding member when the insect trap is assembled, (iv) locking elements that extend downwardly from the bottom ring and are inserted into the corresponding apertures of the upper ring of the guiding member, (v) a set of retention blades that extend downwards from the perforated top end, (vi) a number of perforations in the bottom ring, and (vii) a set of pockets that extend from the cylindrical upright body;

such that the base member, the guiding member and the capture chamber are co-axially aligned along their central axis when the guiding member is mounted on the base member and the capture chamber is mounted on the guiding member.

2. The insect trap of claim 1, wherein at least one opening of the top of the base member serves as an attachment location for a nail or other connecting device on a mounting pole used to hold the insect trap.

3. The insect trap of claim 1, wherein the base member comprises a semi-tubular extension extending downwards from the top of the base member and being surrounded by the tubular vertical body of the base member.

4. The insect trap of claim 1, wherein a plurality of holes are near the open bottom of and in the vertical body of the base member, with the plurality of holes in the vertical body serving as an entrance for a tying means used to tie or strap the base member to a mounting pole that is inserted from the open bottom and that is surrounded by the tubular vertical body.

5. The insect trap of claim 1, wherein the upper ring is at a position to enable the upper section and the lower section of the plastic meshes to be arranged at an angle to provide the same slope for the lower section, for the upper section and for the lower ring.

6. The insect trap of claim 1, wherein:

(a) the lower section of the plastic meshes extends to and ends at bottom of the outer vertical surface of the upper ring; and (b) the upper section of the plastic meshes extends from and above inner circle of the top surface of the upper ring;

such that the upper section of the plastic meshes, the lower section of the plastic meshes and the lower ring have the same slope.

7. The insect trap of claim 1, wherein:

(a) the plastic meshes have open spaces that are particularly sized to prevent insects in the guiding member from exiting via the open spaces of the plastic meshes; and (b) the orifice at the apex of the plastic meshes is at least large enough to allow the exit of the insects from inside the plastic meshes into the capture chamber.

8. The insect trap of claim 1, wherein the orifice has a diameter of between about ⅛ inch to about ¼ inch.

9. The insect trap of claim 1, wherein each connecting means further comprises a lock foot having:

(a) an upper portion that fits around a corresponding part of the tubular vertical body of the base member; and (b) a lower portion that extends at an outward angle to the upper portion of the lock foot;

such that the lock foot serves to further secure the guiding member to the base member.

10. The insect trap of claim 9, wherein the lower portion of the lock foot is ejectable, such that, when the guiding member is twisted around the base member, the lower portion of the lock foot straightens and extends along and upon the corresponding portion of the tubular vertical body of the base member as soon as some force is exerted upon the lower portion of the lock foot.

11. The insect trap of claim 1, wherein the number of openings of the top of the base member each have:

(a) a wider section that is wide enough to allow insertion of only the bottom extension of the connecting means; and (b) a narrower section that is wide enough to allow entrance of only the cross-sectional, upwardly-extending blade of the bottom extension;

such that the guiding member is connected to the base member upon placing the bottom extension of each connecting means into the wider section and, then, twisting the guiding member in one direction whereby the cross-sectional, upwardly-extending blade is moved into and is set in the narrower section; and such that the guiding member can be separated only by twisting the guiding member in the opposite direction and, then, lifting the guiding member.

12. The insect trap of claim 1, wherein, when the guiding member is connected to the base member, the cross-sectional, upwardly-extending blade of each connecting means extends perpendicular to the top of the base member and the round bottom portion extends parallel to the top of the base member.

13. The insect trap of claim 1, wherein pheromone dispensers are positioned in the set of retention blades and insecticide dispensers are positioned in the set of pockets.

14. The insect trap of claim 1, wherein the bottom ring of the capture chamber also comprises at least one boss extending upwardly from the bottom ring such that one perforation of the bottom ring is under the boss, with a number of locking pins each being inserted via one corresponding boss through the corresponding perforation of the bottom ring and, then, through the corresponding aperture of the upper ring of the guiding member in order to connect the capture chamber to the guiding member.

15. The insect trap of claim 14, wherein the number of locking pins each comprise:

(a) an upper body being used for handling the locking pin; and (b) a thrusting lower body being sized and shaped such that the thrusting lower body is easily and smoothly inserted and passed through the boss, through the perforation of the bottom ring of the capture chamber and then through the aperture of the upper ring of the guiding member and having a thrusting part that snaps at an angle as soon as the thrusting lower body is inserted into the aperture of the upper ring;

such that when the thrusting lower body connects the capture chamber to the guiding member, the upper body is positioned and rests above the boss and the thrusting part of the thrusting lower body extends below and is blocked by the top surface of and extends in the empty space of the upper ring of the guiding member; and such that if the thrusting lower body is to be moved out of the corresponding aperture, the thrusting part of the thrusting lower body breaks off and remains under the top surface of the upper ring until removed separately.

16. The insect trap of claim 15, wherein the number of perforations of the bottom ring are positioned such that, after each locking element is placed in the corresponding aperture of the upper ring, upon twisting the capture chamber, the number of perforations into which the number of locking pins are to be inserted are aligned with and positioned upon the number of apertures of the upper ring of the guiding member.

17. The insect trap of claim 1, wherein the perforated top end of the capture chamber has a basically flat surface.

18. The insect trap of claim 1, wherein the insect trap includes polypropylene and, thus, is flexible and recyclable.

19. The insect trap of claim 1, wherein the insect trap comprises ultraviolet-resistant components.

20. The insect trap of claim 1, wherein the base member of the insect trap contains a fluorescent yellow-green pigment.

21. The insect trap of claim 1, wherein the capture chamber comprises clear plastic.

\* \* \* \* \*